(12) United States Patent
Escobedo Hernandez (10) Patent No.: US 10,215,665 B2
(45) Date of Patent: Feb. 26, 2019

(54) SYSTEM AND METHOD TO MODEL POWER OUTPUT OF AN ENGINE

(71) Applicant: General Electric Company, Schenectady, NY (US)

(72) Inventor: Ernesto Heliodoro Escobedo Hernandez, Queretaro (MX)

(73) Assignee: General Electric Company, Schenectady, NY (US)

(*) Notice: Subject to any disclaimer, the term of this patent is extended or adjusted under 35 U.S.C. 154(b) by 304 days.

(21) Appl. No.: 15/145,497

(22) Filed: May 3, 2016

(65) Prior Publication Data

US 2017/0322116 A1 Nov. 9, 2017

(51) Int. Cl.
*G01M 15/14* (2006.01)
*F02C 9/50* (2006.01)
(Continued)

(52) U.S. Cl.
CPC ........... *G01M 15/14* (2013.01); *F01K 23/101* (2013.01); *F02C 9/50* (2013.01); *F02D 41/1401* (2013.01); *F02D 41/0007* (2013.01); *F02D 2041/1412* (2013.01); *F02D 2041/1433* (2013.01); *F02D 2200/0402* (2013.01); *F02D 2200/0414* (2013.01); *F02D 2200/0418* (2013.01); *F02D 2200/703* (2013.01); *F02D 2250/18* (2013.01); *F02M 25/022* (2013.01); *F05D 2220/32* (2013.01); *F05D 2260/207* (2013.01); *F05D 2260/211* (2013.01); *F05D 2260/212* (2013.01); *F05D 2270/053* (2013.01);
(Continued)

(58) Field of Classification Search
CPC .................. G01M 15/14; F01K 23/101; F02D 2041/1433; F02D 2200/0402; F02D 41/0007; F05D 2270/71; F05D 2270/335
See application file for complete search history.

(56) References Cited

U.S. PATENT DOCUMENTS 4,766,553 A 8/1988 Kaya et al.
7,058,552 B2 6/2006 Stothert et al.
(Continued)

FOREIGN PATENT DOCUMENTS

DE 19963358 A1 7/2001
EP 2 549 415 A1 1/2013
EP 2 789 837 A1 10/2014

OTHER PUBLICATIONS

Lei, Investigation of performance of a compression-ignition engine with pressure-wave supercharger, Oct. 2009, Energy.*
(Continued)

*Primary Examiner* — Manish S Shah
*Assistant Examiner* — Timothy P Graves
(74) *Attorney, Agent, or Firm* — GE Global Patent Operation; Marc A. Vivenzio (57) ABSTRACT

A system includes an engine configured to generate power to drive a load. The system also includes a power augmentation system configured to augment a power output of the engine when the power augmentation system is activated. Additionally, the system includes a controller operatively coupled to the power augmentation system. The controller is configured to estimate a potential change in the power output of the engine caused by activation of the power augmentation system using a power augmentation model and an engine performance model.

17 Claims, 6 Drawing Sheets

(51) Int. Cl.
  *F02D 41/14* (2006.01)
  *F01K 23/10* (2006.01)
  *F02M 25/022* (2006.01)
  *F02D 41/00* (2006.01)

(52) U.S. Cl.
  CPC .. *F05D 2270/304* (2013.01); *F05D 2270/306* (2013.01); *F05D 2270/311* (2013.01); *F05D 2270/312* (2013.01); *F05D 2270/313* (2013.01); *F05D 2270/335* (2013.01); *F05D 2270/44* (2013.01); *F05D 2270/71* (2013.01); *Y02E 20/16* (2013.01)

(56) References Cited

U.S. PATENT DOCUMENTS

| | | |
|---|---|---|
| 7,244,294 B2 | 7/2007 | Kates |
| 7,489,990 B2 | 2/2009 | Fehr et al. |
| 8,437,880 B2 | 5/2013 | Long et al. |
| 8,452,515 B2 | 5/2013 | Drohan et al. |
| 8,639,480 B2 | 1/2014 | Arnold et al. |
| 8,924,026 B2 | 12/2014 | Federspiel et al. |
| 9,002,530 B2 | 4/2015 | O'Conner et al. |
| 2004/0102872 A1 | 5/2004 | Schick et al. |
| 2007/0151240 A1* | 7/2007 | Mulloy .................. F01N 3/023 60/599 |
| 2013/0151022 A1 | 6/2013 | Schroder et al. |
| 2015/0275786 A1* | 10/2015 | Jin ........................ F02D 28/00 701/102 |

OTHER PUBLICATIONS

Extended European Search Report and Opinion issued in connection with corresponding EP Application No. 17168550.6 dated Sep. 1, 2017.

\* cited by examiner

SYSTEM AND METHOD TO MODEL POWER OUTPUT OF AN ENGINE

BACKGROUND OF THE INVENTION

The subject matter disclosed herein relates to engine systems, and more particularly, to methods and systems for modeling power output of engine systems.

Certain power generation systems may include an engine, such as a gas turbine, and a control system configured to monitor and control operation of the engine. For example, the control system may monitor the power output of the engine and may adjust operating parameters of the engine to achieve a desired power output. In some situations, the control system may control a power augmentation system, such as an evaporative cooler, to adjust operating parameters and the power output of the engine. However, the power output of the engine and the performance of the power augmentation system may vary with changes in ambient conditions, such as temperature, pressure, and humidity. As such, it may be difficult to predict a potential increase in power output of the engine gained by activating the power augmentation system.

BRIEF DESCRIPTION OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the disclosed subject matter. Indeed, the disclosed subject matter may encompass a variety of forms that may be similar to or different from the embodiments set forth below.

In one embodiment, a system includes an engine configured to generate power to drive a load. The system also includes a power augmentation system configured to augment a power output of the engine when the power augmentation system is activated. Additionally, the system includes a controller operatively coupled to the power augmentation system. The controller is configured to estimate a potential value of a first operating parameter of the engine caused by activation of the power augmentation system by inputting a measured value of the first operating parameter of the engine in a power augmentation model for the power augmentation system. Further, the controller is configured to estimate a potential change in the power output of the engine caused by activation of the power augmentation system by inputting the measured value and the potential value of the first operating parameter in an engine performance model for the engine that predicts power output of the engine.

In one embodiment, a system includes a controller operatively coupled to a power augmentation system configured to increase a power output of an engine. The controller is configured to measure a plurality of operating parameters of the engine using a plurality of sensors. Additionally, the controller is configured to estimate a potential value of a first operating parameter of the plurality of operating parameters caused by activation of the power augmentation system by inputting a measured value of the first operating parameter of the plurality of operating parameters in a power augmentation model for the power augmentation system. Further, the controller is configured to estimate a potential increase in the power output of the engine caused by activation of the power augmentation system by inputting the measured value and the potential value of the first operating parameter of the plurality of operating parameters in an engine performance model for the engine that predicts power output of the engine.

In one embodiment, a method includes measuring, via a controller, a plurality of operating parameters of an engine. The method also includes selecting, via the controller, a power augmentation model from two or more power augmentation models for a power augmentation system configured to increase a power output of the engine. Additionally, the method includes estimating, via the controller, a potential value of a first operating parameter of the plurality of operating parameters caused by activation of the power augmentation system by inputting a measured value of the first operating parameter of the plurality of operating parameters in the power augmentation model. Further, the method includes estimating, via the controller, a potential increase in the power output of the engine caused by activation of the power augmentation system by inputting the measured value and the potential value of the first operating parameter of the plurality of operating parameters in an engine performance model for the engine that predicts power output of the engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the disclosed subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the disclosed subject matter, the articles "a," "an," "the," and "said" are intended to mean that there are one or more of the elements. The terms "comprising," "including," and "having" are intended to be inclusive and mean that there may be additional elements other than the listed elements.

As discussed below, an engine may generate power to drive a load, such as an electrical generator. However, the power output of the engine may vary with changes in operating parameters of the engine. For example, the power output of the engine may vary with ambient conditions, such as temperature, pressure, and humidity. Additionally, the performance of the engine may deviate from ideal behavior over time, which may negatively affect the power output of the engine.

Further, as discussed below, a power augmentation system may be used to augment (e.g., increase) the power output of the engine. In particular, the power augmentation system may augment the power output of the engine by modifying the value of at least one input operating parameter of the engine. For example, in some embodiments, the power augmentation system may include an evaporative cooler, a chiller, a water injection unit, or a combination thereof to reduce a temperature of an oxidant (e.g., ambient air) routed to the engine. In certain embodiments, the power augmentation system may include a compressor configured to increase a pressure of the oxidant routed to the engine. However, it may be difficult to predict the change in the value of the at least one operating parameter caused by activation of the power augmentation system. As such, it may be difficult to predict a potential change in the power output of the engine caused by activation of the power augmentation system due to the difficulty in assessing the performance of the engine and the difficulty in predicting a potential change in an operating parameter (e.g., an input operating parameter) of the engine caused by activation of the power augmentation system.

Accordingly, the present disclosure is generally related to systems and methods for estimating (e.g., via a processor-based controller) a potential change in the power output of an engine caused by activation of a power augmentation system. Specifically, as discussed below, a controller may use a power augmentation model with at least one input operating parameter to estimate a potential value of the at least one input operating parameter caused by activation of the power augmentation system. For example, the power augmentation model may estimate a potential value of a temperature of an oxidant (e.g., ambient air) caused by activation of the power augmentation system (e.g., an evaporative cooler, a chiller, a water injection unit, etc.) based on an initial measured value of the temperature of the oxidant. In some embodiments, the power augmentation model may be specific for the power augmentation system. For example, the power augmentation model may be generated and trained using historical data from the specific power augmentation system that is used with the engine. In this manner, the power augmentation model may account for performance characteristics and efficiencies that are specific to the power augmentation system, which may increase the accuracy of potential values of operating parameters estimated by the power augmentation model.

Additionally, as discussed below, the controller may use estimated potential values of one or more input operating parameters of the engine from the power augmentation model in an engine performance model to estimate a potential change in power output of the engine caused by activation of the power augmentation system. For example, the engine performance model may be a physics-based model or an engine simulation model that is configured to predict or estimate potential values of one or more output operating parameters of the engine, such as power output, based on measured or estimated values of one or more input operating parameters. In some embodiments, the controller may use the engine performance model with the estimated potential values of the one or more input operating parameters of the engine to generate a first estimate of the power output of the engine when the power augmentation system is activated (e.g., when the power augmentation system is modifying the one or more input operating parameters of the engine to augment the power output of the engine). Additionally, the controller may use the engine performance model with corresponding measured values of the one or more input operating parameters of the engine to generate a second estimate of the power output of the engine without the power augmentation system (e.g., when the power augmentation system is deactivated and is not modifying the one or more operating parameters of the engine and is not augmenting the power output of the engine). Further, the controller may determine a potential change in the power output of the engine caused by activation of the power augmentation system based on a difference between the first and second estimates. In some embodiments, the controller may provide the potential change in the power output and/or recommendations based on the potential change in the power output to a user, which may facilitate the user in determining whether to activate the power augmentation system.

Further, in some embodiments, the controller may determine one or more performance metrics for the engine using the engine performance model. For example, the controller may use measured values of one or more input operating parameters in the engine performance model to generate estimated values of one or more output operating parameters. Further, the controller may determine one or more performance metrics for the engine based on a comparison of the estimated values of the one or more output operating parameters and corresponding measured values of the one or more output operating parameters. In particular, deviations between the estimated values of the output operating parameters and the actual measured values of the output operating parameters may be used to assess the performance of the engine relative to ideal performance and to determine one or more performance metrics. In some embodiments, the controller may use the one or more performance metrics in the engine performance model when estimating the potential change in the power output of the engine. By taking the performance (e.g., efficiency, degradation, health, use, service history, upgrades, replacement parts, etc.) of the specific engine into account, the controller may increase the accuracy of the estimated potential change in the power output of the engine caused by activation of the power augmentation system.

Figure 1:
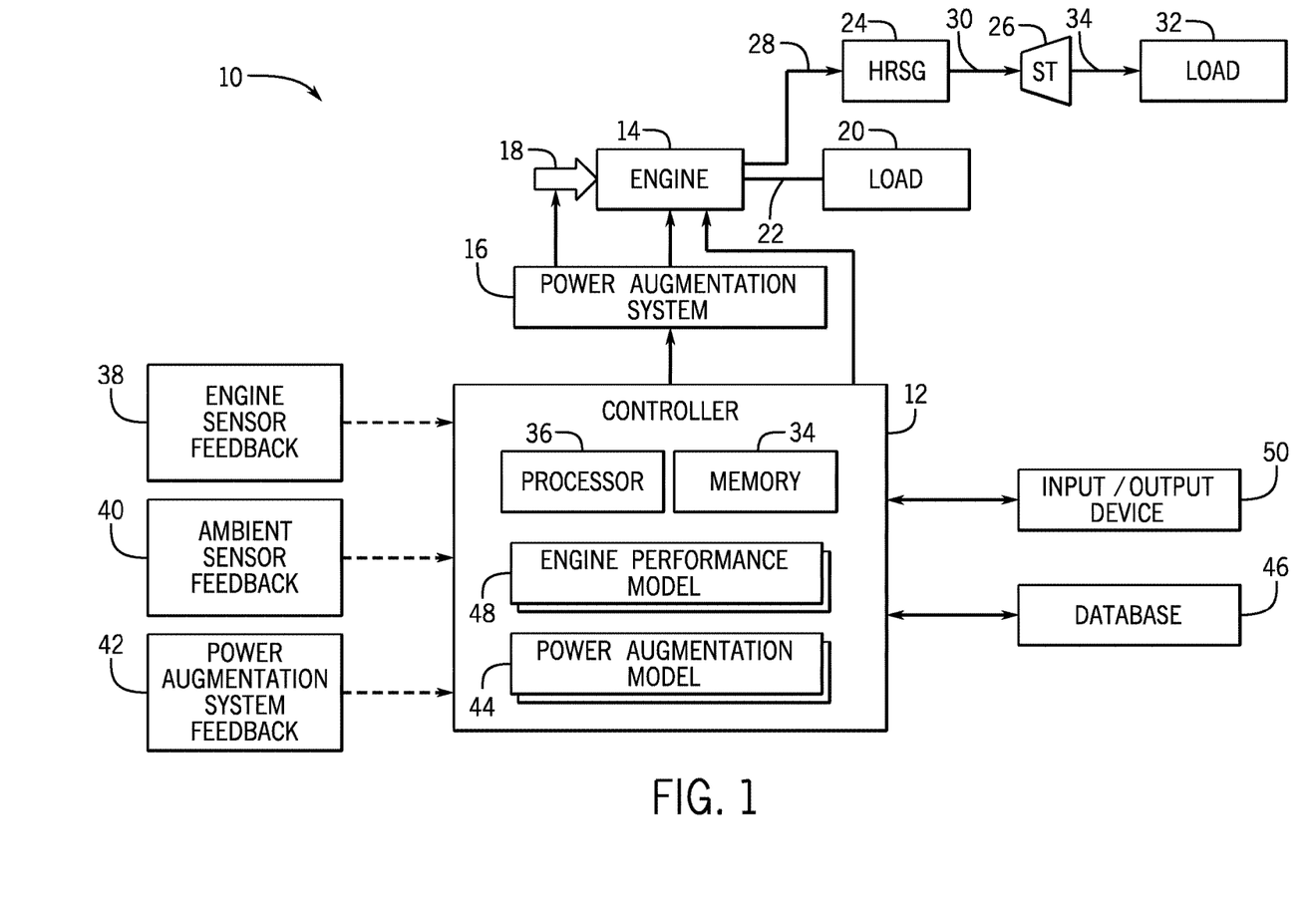
FIG. 1 a block diagram of a combined cycle power plant including an engine, a controller, and a power augmentation system, in accordance with an embodiment of the present disclosure.

With the foregoing in mind, FIG. 1 is a block diagram of an embodiment of a system 10 with a controller 12 (e.g., processor-based controller) that monitors at least one operating parameter of an engine 14 to estimate a potential increase in the power output of the engine 14 caused by activation of a power augmentation system 16. The engine 14 may be a gas turbine engine, a reciprocating internal combustion engine, another heat engine or combustion system, or any other suitable engine. In operation, the engine 14 may receive an oxidant 18 (e.g., air, oxygen, oxygen enriched air, or oxygen reduced air) and may combust a mixture of the oxidant 18 and fuel to create torque that drives a load 20, such as an electrical generator. For example, the engine 14 may induce rotation of a shaft 22 coupled to the load 20, which may use rotational energy of the shaft 22 to generate electricity. Accordingly, the power output of the engine 14 may be based on the torque and angular velocity of the shaft 22.

In some embodiments, the system 10 may be a combined cycle power plant that includes a heat recovery steam generator (HRSG) 24 and a steam turbine 26. In order to reduce energy waste, the system 10 may use the thermal energy in exhaust gas 28 from the engine 14 to heat a fluid and create steam 30 in the HRSG 18. The steam 30 generated by the HRSG 24 may be supplied to the steam turbine 26, which may use the steam 30 to create torque that drives a load 32, such as an electrical generator. For example, the steam turbine 26 may induce rotation of a shaft 34 coupled to the load 32, which may use rotational energy of the shaft 34 to generate electricity. Accordingly, in some embodiments, the power output of the engine 14 may be based on the torque and angular velocity of the shaft 22, as well as the temperature of the exhaust gas 28.

The power output of the engine 14, which may be based on the torque and angular velocity of the shaft 22 and/or the temperature of the exhaust gas 28, may vary with certain input operating parameters of the engine 14. For example, the power output of the engine 14 may vary based on ambient temperature, the temperature of the oxidant 18, ambient pressure, the pressure of the oxidant 18, ambient relative humidity, the relative humidity of the oxidant 18, and/or an amount of fuel routed to the engine 14. To adjust the power output of the engine 14, the system 10 includes the power augmentation system 16, which may adjust values of one or more input operating parameters of the engine 14 to augment (e.g., increase or decrease) the power output of the engine 14 when the power augmentation system 16 is activated. As used herein, the power augmentation system 16 may be referred to as activated when the power augmentation system 16 is modifying at least one operating parameter of the engine 14. Additionally, as used herein, the power augmentation system 16 may be referred to as deactivated when the power augmentation system 16 is not modifying any operating parameters of the engine 14.

The power augmentation system 16 may be configured to adjust any suitable operating parameter of the engine 14. For example, the power augmentation system 16 may be configured to adjust the temperature, pressure, relative humidity, density, and/or composition (e.g., percent by volume of oxygen, nitrogen, other gases or additives) of the oxidant 18. In some embodiments, the power augmentation system 16 may be configured to adjust an amount of fuel routed to the engine 14 and/or a temperature of a combustion zone of the engine 14. It should be noted that in embodiments in which the oxidant 18 includes ambient air, the temperature, pressure, and relative humidity of the oxidant 18 may also be referred to as ambient temperature, ambient pressure, and ambient relative humidity, respectively. Further, the power augmentation system 16 may include any suitable component and any number of components (e.g., 1, 2, 3, 4, 5, or more) to adjust values of one or more operating parameters of the engine 14 to augment the power output of the engine 14. For example, in some embodiments, the power augmentation system 16 may include an evaporative cooler, a chiller, and/or a water supply (e.g., a water injection unit) configured to adjust (e.g., increase or decrease) the temperature, relative humidity, and/or density of the oxidant 18 (e.g., ambient air) that may be delivered to the engine 14. In certain embodiments, the power augmentation system 16 may include a compressor configured to increase a pressure of the oxidant 18 (e.g., ambient air) that may be delivered to the engine 14. In some embodiments, the power augmentation system 16 may include a fuel supply that is configured to supply a fuel to the engine 14 and/or adjust an amount of fuel supplied to the engine 14. Various embodiments of the power augmentation system 16 will be discussed in more detail below in FIG. 2.

As noted above, the system 10 also includes the controller 12. The controller 12 may include a memory 34 (e.g., one or more memory devices) and a processor 36 (e.g., one or more processors). The processor 36 may include one or more general purpose processors, one or more special-purpose microprocessors, one or more application specific integrated circuits (ASICS), one or more reduced instruction set (RISC) processors, or any combination thereof. The memory device 34 may include a volatile memory, a nonvolatile memory, a random access memory (RAM), a read-only memory (ROM), a flash memory, a hard drive, or any other suitable optical, magnetic, or solid-state storage medium, or a combination thereof. The memory 34 may include one or more tangible, non-transitory, machine-readable media collectively storing instructions and steps written in software code that can be accessed and executed by the processor 36 to perform the methods and control actions described herein.

The controller 12 monitors at least one operating parameter of the engine 14 to estimate a potential power output of the engine 14 caused by activation of a power augmentation system 16. The controller 12 may communicate with and/or control various components of the system 10 in order to monitor at least one operating parameter of the engine 14 and to estimate the potential change in power output of the engine 14. For example, the controller 12 may communicate with and/or control the engine 14, the power augmentation system 16, the HRSG 24, the steam turbine 26, the load 20, the load 32, and various components, such as electronics, sensors, valves, pumps, motors, actuators, etc. In particular, the controller 12 may monitor at least one operating parameter of the engine 14 and estimate the potential power output and/or the potential change in power output of the engine 14 caused by activation of the power augmentation system 16 based at least in part on engine sensor feedback 38, ambient sensor feedback 40, power augmentation system sensor feedback 42, or a combination thereof. It should be appreciated that the system 10 may include any suitable number and type of sensors disposed about (e.g., disposed in, disposed on, disposed proximal to, attached to, integrated with, etc.) the engine 14, the shaft 22, the load 20, the HSRG 24, the steam turbine 26, the load 32, the shaft 34, and/or the power augmentation system 16 or any other suitable location about the system 10 to generate the engine sensor feedback 38, the ambient sensor feedback 40, and/or the power augmentation system sensor feedback 42. For example, the system 10 may include one or more temperature sensors, pressure sensors, humidity sensors, density sensors, flow rate sensors, exhaust emission sensors (e.g., NOx, CO, $O_2$, unburnt fuel, particulate matter, etc.), rotation sensors, torque sensors, vibration sensors, speed sensors, optical sensors, clearance sensors (e.g., between rotating and stationary parts), or any combination thereof.

As discussed in more detail below, the controller 12 may estimate a potential change in the power output of the engine 14 caused by activation of the power augmentation system 16 based at least in part on an estimate of a potential change in a value of at least one input operating parameter of the engine 14 caused by activation of the power augmentation system 16. For example, the controller 12 may measure (e.g., sense) at least one input operating parameter of the engine 14 using the engine sensor feedback 38, the ambient sensor feedback 40, and/or the power augmentation system sensor feedback 42. In some embodiments, the controller 12 may measure one or more input operating parameters of the engine 14 that may affect the power output of the engine 14. For example, the controller 12 may measure the temperature of the oxidant 18, the pressure of the oxidant 18, the relative humidity of the oxidant 18, the density of the oxidant 18, the flow rate or mass flow of the oxidant 18, the composition of the oxidant 18, and/or an amount of fuel supplied to the engine 14.

Additionally, the controller 12 may estimate a potential change in the value of the at least one input operating parameter using a power augmentation model 44. In particular, the controller 12 may input a measured value of the at least one input operating parameter in the power augmentation model 44 to estimate a potential value of the at least one input operating parameter caused by activation of the power augmentation system 16. The power augmentation model 44 may include physics-based models, such as thermodynamic models, fluid models, computational fluid dynamics models, and the like. In some embodiments, the power augmentation model 44 may include statistical models, such as regression analysis models, data mining models (e.g., clustering models, classification models, association models), and the like. Regression analysis may be used to find functions capable of modeling future trends within a certain error range. Association techniques may be used to find relationships between variables. Further, in some embodiments, the power augmentation model 44 may include artificial intelligence models, such as expert systems (e.g., forward chained expert systems, backward chained expert systems), neural networks, fuzzy logic systems, state vector machines, inductive reasoning machines, machine learning systems, Bayesian inference systems, and the like.

For example, in some embodiments, the power augmentation system 16 may include an evaporative cooler configured to reduce a temperature of the oxidant 18. In such embodiments, the controller 12 may measure the temperature of the oxidant 18 using the engine sensor feedback 38, the ambient sensor feedback 40, and/or the power augmentation system sensor feedback 42. Additionally, the controller 12 may input the measured value of the temperature of the oxidant 18 in the power augmentation model 44, which may output an estimate of a potential value of the temperature of the oxidant 18 caused by activation of the evaporative cooler. For example, the power augmentation model 44 may estimate an output temperature of a fluid after the fluid has passed through the evaporative cooler based on a measured initial value of the temperature of the fluid (e.g., an input temperature of the fluid before the fluid enters or passes through the evaporative cooler).

It should be appreciated that the controller 12 may measure and input more than one operating parameter in the power augmentation model 44 to estimate one or more potential values of one or more operating parameters caused by activation of the engine 14. In particular, the controller 12 may input measured values of any number of operating parameters of the engine (e.g., 1, 2, 3, 4, 5, 6, 7, 8, 9, 10, or more) in the power augmentation model 44 to estimate potential values of any number of operating parameters of the engine (e.g., 1, 2, 3, 4, 5, 6, 7, 8, 9, 10, or more). For example, in some embodiments, the power augmentation system 16 may include an evaporative cooler configured to reduce a temperature of the oxidant 18, and the controller 12 may be configured to input measured values of the temperature and relative humidity of the oxidant 18 in the power augmentation model 44 to estimate a potential value of the temperature and/or relative humidity of the oxidant 18 caused by activation of the evaporative cooler.

As discussed in more detail below with respect to FIG. 6, in some embodiments, the power augmentation model 44 may be generated (e.g., trained) using historical data for the power augmentation system 16 that is used to augment the power output of the engine 14. For example, the power augmentation system 16 may include an evaporative cooler, and the power augmentation model 44 may be generated using historical data for the specific evaporative cooler of the power augmentation system 16. Different evaporative coolers may have different efficiencies and performance characteristics, even for evaporative coolers of the same type, brand, model number, etc. Indeed, any component of the power augmentation system 16 (e.g., evaporative cooler, chiller, water injection unit, compressor, fuel supply, steam supply, etc.) may have different efficiencies and different performance characteristics from other components of the same type that are used with other engines in different systems. Accordingly, by generating or training the power augmentation model 44 using historical data for a particular component of the power augmentation system 16, the power augmentation model 44 may generate a more accurate estimate of potential values of operating parameters of the engine 14 caused by activation of the particular component of the power augmentation system 16. In some embodiments, the power augmentation model 44 may be generated using historical data from a group or an entire fleet of the power augmentation system 16 (e.g., a group of evaporative coolers, a group of chillers, etc.).

In some embodiments, the power augmentation model 44 may be stored in the memory 34. In certain embodiments, the controller 12 may receive the power augmentation model 44 from a database 46 (e.g., a remote database). In some embodiments, the controller 12 may include two or more power augmentation models 44 (e.g., stored in the memory 34 and/or received or downloaded from the database 46). For example, in some embodiments, the power augmentation system 16 may include two or more components (e.g., evaporative cooler, chiller, water injection unit, compressor, fuel supply, steam supply, etc.), and the controller 12 may include two or more power augmentation models 44, where each power augmentation model 44 of the two or more power augmentation models is specific for one component of the power augmentation system 16. By way of example, the power augmentation system 16 may include an evaporative cooler and a water injection unit, and the controller 16 may include a first power augmentation model 44 for the evaporative cooler and a second power augmentation model 44 for the water injection unit. Additionally, in some embodiments, the controller 12 may include two or more power augmentation models 44 for the same component of the power augmentation system 12. For example, the two or more power augmentation models 44 for the same component of the power augmentation system 12 may use different algorithms, may use different input operating parameters, and/or may estimate potential values of different input operating parameters. Further, in some embodiments, each power augmentation model 44 may be associated with a metric (e.g., a fitness metric, a correlation coefficient, an error function, a performance metric, etc.), which may be indicative of the accuracy of potential values estimated using the respective power augmentation model 44. Accordingly, the controller 12 may be configured to select a power augmentation model 44 from two or more power augmentation models 44 based on the metrics, the measured input operating parameters, a desired input operating parameter to estimate, and/or a desired component of the power augmentation system 16 to use to augment the power output of the engine 14.

After the controller 12 estimates a potential value of at least one input operating parameter of the engine 14 caused by activation of the power augmentation system 16, the controller 12 may use at least the estimated potential value in an engine performance model 48 to estimate a potential power output or a potential change in power output of the engine 14 caused by activation of the power augmentation system 16. The engine performance model 48 may include any suitable model configured to estimate, predict, or derive one or more output operating parameters (e.g., power output) of the engine 14 based on at least one input operating parameter of the engine 14. For example, in some embodiments, the engine performance model 48 may include physics-based models, such as thermodynamic models, fluid models, computational fluid dynamics models, cycle deck models, and the like. In some embodiments, the engine performance model 48 may include statistical models, such as regression analysis models, data mining models (e.g., clustering models, classification models, association models), and the like. Regression analysis may be used to find functions capable of modeling future trends within a certain error range. Association techniques may be used to find relationships between variables. Further, the engine performance model 48 may include artificial intelligence models, such as expert systems (e.g., forward chained expert systems, backward chained expert systems), neural networks, fuzzy logic systems, state vector machines, inductive reasoning machines, machine learning systems, Bayesian inference systems, and the like. In certain embodiments, the engine performance model 48 may include an adaptive real-time engine simulation (ARES) model that may, in real-time, model one or more operating parameters of the engine 14.

For example, the engine performance model 48 may receive real-time, measured values of input operating parameters of the engine 14 via the engine sensor feedback 38, the ambient sensor feedback 40, the power augmentation system sensor feedback 42, and/or control effectors. The input operating parameters of the engine 14 may include, for example, ambient temperature, ambient pressure, specific humidity, temperature of the oxidant 18, pressure of the oxidant 18, relative humidity of the oxidant 18, density of the oxidant 18, composition of the oxidant 18, fuel type (e.g., composition), fuel flow rate to engine 14, fuel temperature, emissions levels (e.g., CO, NO, $O_2$, unburnt fuel, particulate matter, etc.), vibration levels, inlet pressure loss, exhaust pressure loss, inlet bleed heat, compressor inlet temperature, shaft speed, load conditions of the system 10, load condition of the engine 14, and/or any other suitable operating parameter. The engine performance model 48 may use one or more input operating parameters to derive, estimate, or predict one or more output operating parameters of the engine 14. For example, the output operating parameters may include power output of the engine 14, conditions of the exhaust gas 28 (e.g., temperature, pressure, and/or flow), conditions of the shaft 22 (e.g., torque and/or rotational speed), flame or firing temperature, turbine power, compressor power, compressor inlet conditions (e.g., temperature, pressure, flow), compressor conditions (e.g., temperature, pressure, flow) at one or more intermediate stages of the compressor, compressor discharge conditions (e.g., temperature, pressure, flow), compressor pressure ratio, and/or any other suitable parameters.

In some embodiments, the controller 12 may use the estimated potential value of at least one input operating parameter in the engine performance model 48 to estimate the potential value of the power output of the engine 14. In certain embodiments, the controller 12 may use the estimated potential value of an input operating parameter and a measured value of the input operating parameter in the engine performance model 48 to estimate the potential change of the power output of the engine 14. For example, the controller 12 may measure the actual value of the input operating parameter via the engine sensor feedback 38, the ambient sensor feedback 40, and/or the power augmentation system sensor feedback 42. The controller 12 may use the estimated potential value of the input operating parameter in the engine performance model 48 to generate a first estimate of the power output of the engine 14 when the power augmentation system is activated, and the controller 12 may use the measured value of the input operating parameter in the engine performance model 48 to generate a second estimate of the power output of the engine 14 when the power augmentation system 16 is deactivated. In some embodiments, the controller 12 may estimate, measure, or determine the power output of the engine 14 when the power augmentation system 16 is deactivated based on the engine sensor feedback 38. The controller 12 may then estimate the change in the power output of the engine 14 caused by activation of the power augmentation system 16 based on a difference between the first and second estimates of the power output.

It should be appreciated that the controller 12 may also use measured values of additional input operating parameters of the engine 14, such as those described above, in the engine performance model 48 to estimate the potential value or the potential change in the power output of the engine 14. Further, it should be appreciated that the controller 12 may use the estimated potential value of the operating parameter and measured values of one or more input operating parameters of the engine 14 to estimate other output operating parameters of the engine 14, such as those described above.

In some embodiments, the controller 12 may use the engine performance model 48 to determine one or more performance metrics for the engine 14. For example, the controller 12 may input measured values of one or more input operating parameters of the engine 14 in the engine performance model 48 to generate estimated values of one or more output operating parameters of the engine 14. Additionally, the controller 14 (e.g., via the engine performance model 48) may compare the estimated values of the one or more operating parameters to corresponding measured values (e.g., via the engine sensor feedback 38) and may determine one or more performance metrics for the engine 14 based on differences between the estimated values and measured values. For example, in some embodiments, the controller 12 may determine a performance metric for each estimated output operating parameter. In certain embodiments, the controller 12 may determine an overall performance metric for the engine 14 based on the differences between the estimated values and the measured values. The one or more performance metrics may be indicative of degradation (e.g., wear of parts, changes in clearance, etc.) of the engine 14, inefficiencies of the engine 14, and/or an amount of deviation from ideal behavior. To increase the accuracy of the estimated potential power output or potential change in the power output, the controller 12 may use the one or more performance metrics in the engine performance model 48 for the estimation of the potential power output or the potential change in power output of the engine 14.

In certain embodiments, the controller 12 may provide one or more user-perceivable indications of the estimated potential power output or increase in power output of the engine 14. For example, the controller 12 may be operatively coupled to an input/output device 50, and the controller 12 may cause the input/output device 50 to provide the one or more user-perceivable indications. The input/output device 50 may include a computer, a laptop, a hand-held device, a display, a keyboard, a mouse, or any other suitable components for receiving information from and/or providing information to a user. In some embodiments, the input/output device 50 may numerically and/or graphically display the potential power output and/or increase in power output of the engine.

In some embodiments, the input/output device 50 may be configured to receive inputs from the user. For example, the input/output device 50 may receive user inputs relating a selection of one or more components of the power augmentation system 16 to use in the power augmentation model 44, a selection of one or more input operating parameters of the engine 14 to adjust, a selection of a power augmentation model 44 to use, or any combination thereof. The controller 12 may use the user inputs to estimate the potential power output or potential increase in power output of the engine 14.

Further, in some embodiments, the input/output device 50 may receive user inputs relating to a desired power output and/or a desired increase in power output of the engine 14. In some embodiments, the controller 12 may compare the estimated power output or the estimated increase in power output to the desired power output or the desired increase in power output, respectively. Further, in certain embodiments, the controller 12 may cause the input/output device 50 to provide indications (e.g., numerical indications, graphical indications, etc.) based on the comparison. In some embodiments, the controller 12 may control the power augmentation system 16 based on the comparison. For example, the controller 12 may activate the power augmentation system 16 if the estimated power output or increase in power output is greater than the desired power output or increase in power output. Further, in some embodiments, the input/output device 50 may receive user instructions to activate the power augmentation system 16 (or specific components of the power augmentation system 16), and the controller 12 may be configured to control the power augmentation system 16 based on the user instructions.

Figure 2:
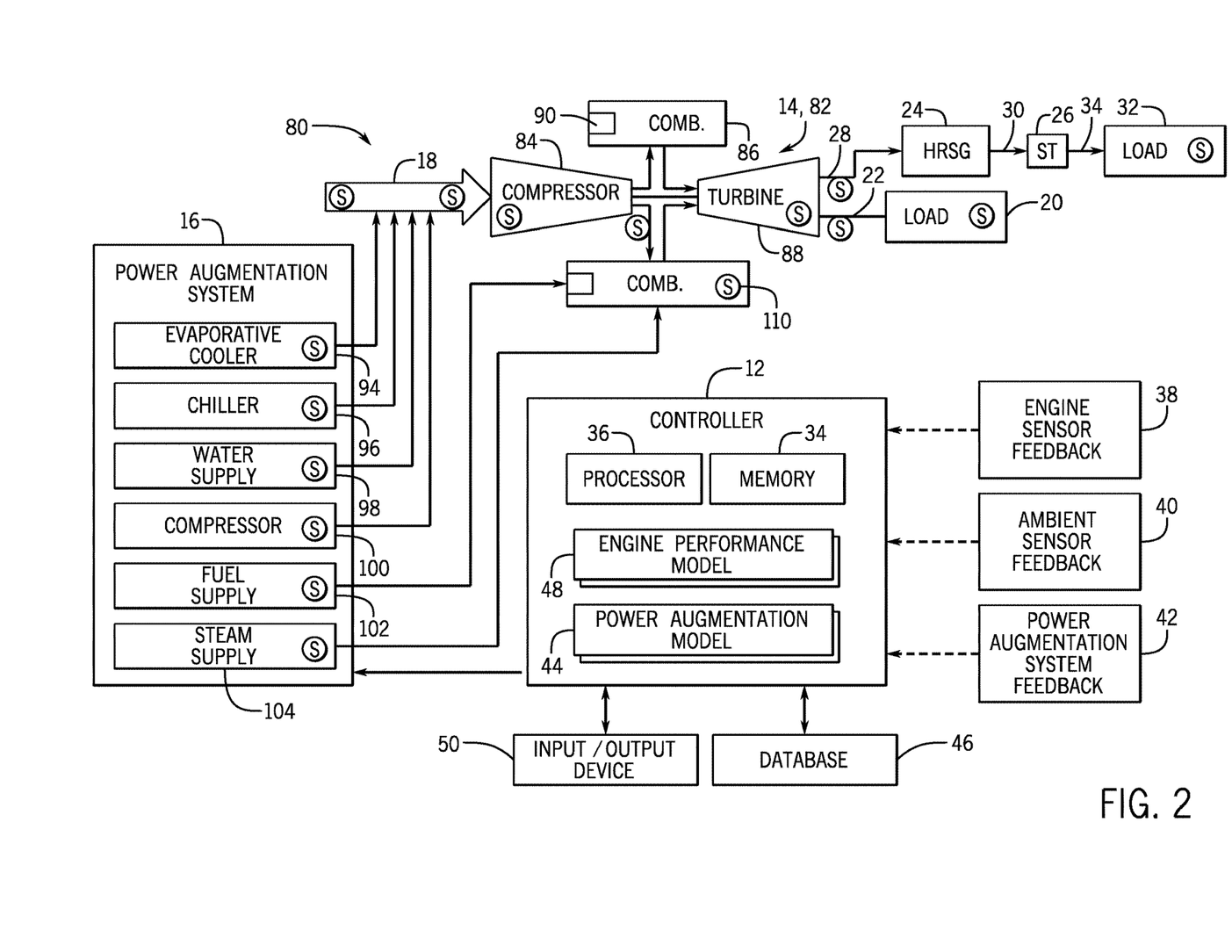
FIG. 2 is a block diagram of a combined cycle power plant including an gas turbine engine, a controller, and a plurality of power augmentation systems, in accordance with an embodiment of the present disclosure.

FIG. 2 is a block diagram of an embodiment of a combined cycle system 80 including a plurality of different types of the power augmentation system 16. The system 80 may also include the controller 12, the engine 14, the load 20, the HRSG 24, the steam turbine 26, and the load 32. In the illustrated embodiment, the engine 14 is a gas turbine 82. The gas turbine 82 may include a compressor 84, a combustor 86, and a turbine 88. In operating, the oxidant 18 (e.g., air, oxygen, oxygen enriched air, or oxygen reduced air) enters the compressor 84, and the compressor 84 pressurizes the oxidant 18 in a series of compressor stages (e.g., rotor disks) with compressor blades. As the compressed oxidant 18 exits the compressor 84, the oxidant 18 enters the combustor 86 and mixes with fuel. The gas turbine 82 may use liquid or gas fuel, such as natural gas and/or a hydrogen rich synthetic gas, to run the gas turbine 82. For example, a plurality of fuel nozzles 90 may intake the fuel, may mix the fuel with the oxidant 18 in a suitable ratio for combustion and may inject the fuel-oxidant mixture into the combustor 86. The fuel-oxidant mixture combusts in a combustion chamber within the combustor 86, thereby creating hot pressurized exhaust gas 28. The combustor 86 may direct the exhaust gas 28 through the turbine 88 where the exhaust gas 28 may contact turbine blades attached to turbine rotor disks (e.g., turbine stages) to force the turbine blades to rotate the rotor disks. The rotation of the rotor disks may induce rotation of the shaft 22, which may be used by the load 20 to generate electricity.

Additionally, as noted above, the exhaust gas 28 may be supplied to the HRSG 24. The HRSG 24 may use the thermal energy in the exhaust gas 28 to generate the steam 30, which may be supplied to the steam turbine 26. The steam 30 may induce rotation of turbine rotor disks in the steam turbine 26, which may induce rotation of the shaft 34. Accordingly, the load 32 may use the rotational energy of the shaft 34 to generate electricity.

As noted above, the power augmentation system 16 may include one or more types of components configured to adjust a value of an operating parameter of the engine 14. As illustrated, the power augmentation system 16 may include an evaporative cooler 94 (e.g., a device that cools an oxidant through the evaporation of water), a chiller 96, a water supply 98, a compressor 100, a fuel supply 102, a steam supply 104, or any combination thereof. For example, the evaporative cooler 94 and/or the water supply 98 may inject water (e.g., water vapor) into the oxidant 18 to reduce the temperature and/or increase the relative humidity of the oxidant 18. The chiller 96 (e.g., heat exchanger) may reduce the temperature of the oxidant 18. Additionally, the compressor 100 may increase a pressure of the oxidant 18. Further, the fuel supply 102 may be configured to supply a fuel to the plurality of fuel nozzles 90 and/or to adjust an amount of fuel injected by the plurality of fuel nozzles 90. Additionally, the steam supply 104 may be configured to inject steam into the combustor 86 (e.g., the combustion zone of the combustor 86) to increase the temperature in the combustor 86.

Additionally, the system 80 may include a plurality of sensors 110 (indicated as an "S" within a circle in FIG. 2) to generate the engine sensor feedback 38, the ambient sensor feedback 40, and/or the power augmentation system sensor feedback 42. In some embodiments, the sensors 110 may be disposed about (e.g., disposed along, in, or proximal to) a flow path of the oxidant 18 (e.g., entering and/or exiting the compressor 84, the evaporative cooler 94, the chiller 96, the water supply 98, and/or the compressor 100). In certain embodiments, the sensors 110 may be disposed about (e.g., disposed in, disposed on, disposed proximal to, attached to, integrated with, etc.) the evaporative cooler 94, the chiller 96, the water supply 98, the compressor 100, the fuel supply 102, the steam supply 104, the compressor 84, the combustor 86, the turbine 88, the shaft 22, the load 20, the HSRG 24, the steam turbine 26, the load 32, and/or the shaft 34. In certain embodiments, the sensors 110 may be disposed about a flow path of the exhaust gas 28 (e.g., exiting the turbine 28 and/or entering the HSRG 24) and/or a flow path of the steam 30 (e.g., exiting the HRSG 24 and/or entering the steam turbine 26).

The sensors 110 may include temperature sensors, pressure sensors, humidity sensors, density sensors, flow rate sensors, flame sensors, fluid composition sensors (e.g., gas or liquid), exhaust emission sensors (e.g., NOx, CO, $O_2$, unburnt fuel, particulate matter, etc.), clearance sensors, rotation sensors, torque sensors, vibration sensors, speed sensors, optical sensors, or any combination thereof. The sensors 110 may generate ambient sensor feedback 40 and/or the power augmentation system sensor feedback 42 relating to temperature, pressure, relative humidity, density, and/or composition of the oxidant 18 (e.g., entering and/or exiting the compressor 84, the evaporative cooler 94, the chiller 96, the water supply 98, and/or the compressor 100). In some embodiments, the sensors 110 may generate engine sensor feedback 38 and/or power augmentation sensor feedback 42 relating to fuel type (e.g., composition), fuel flow rate to fuel nozzles 90, fuel temperature, temperature in the combustor 86, emissions levels (e.g., CO, NO, $O_2$, unburnt fuel, particulate matter, etc.), vibration levels, inlet pressure loss, exhaust pressure loss, inlet bleed heat, compressor inlet temperature, shaft speed, exhaust gas 28 temperature, steam 30 temperature, load conditions of the system 80, load condition of the gas turbine 82, and/or any other suitable operating parameter.

As discussed above, the controller 12 may measure (e.g., sense) at least one input operating parameter of the engine 14 using the engine sensor feedback 38, the ambient sensor feedback 40, and/or the power augmentation system sensor feedback 42. Additionally, as discussed above, the controller 12 may input the measured value of the at least one input operating parameter in the power augmentation model 44 to estimate a potential value of the at least one input operating parameter caused by activation of at least one component of the power augmentation system 16 (e.g., the evaporative cooler 94, the chiller 96, the water supply 98, the compressor 100, the fuel supply 102, and/or the steam supply 104). Further, as discussed above, the controller 12 may use the estimated potential value in the engine performance model 48 to estimate a potential power output or a potential change in power output of the gas turbine 82 caused by activation of the at least one component of the power augmentation system 16.

Figure 3:
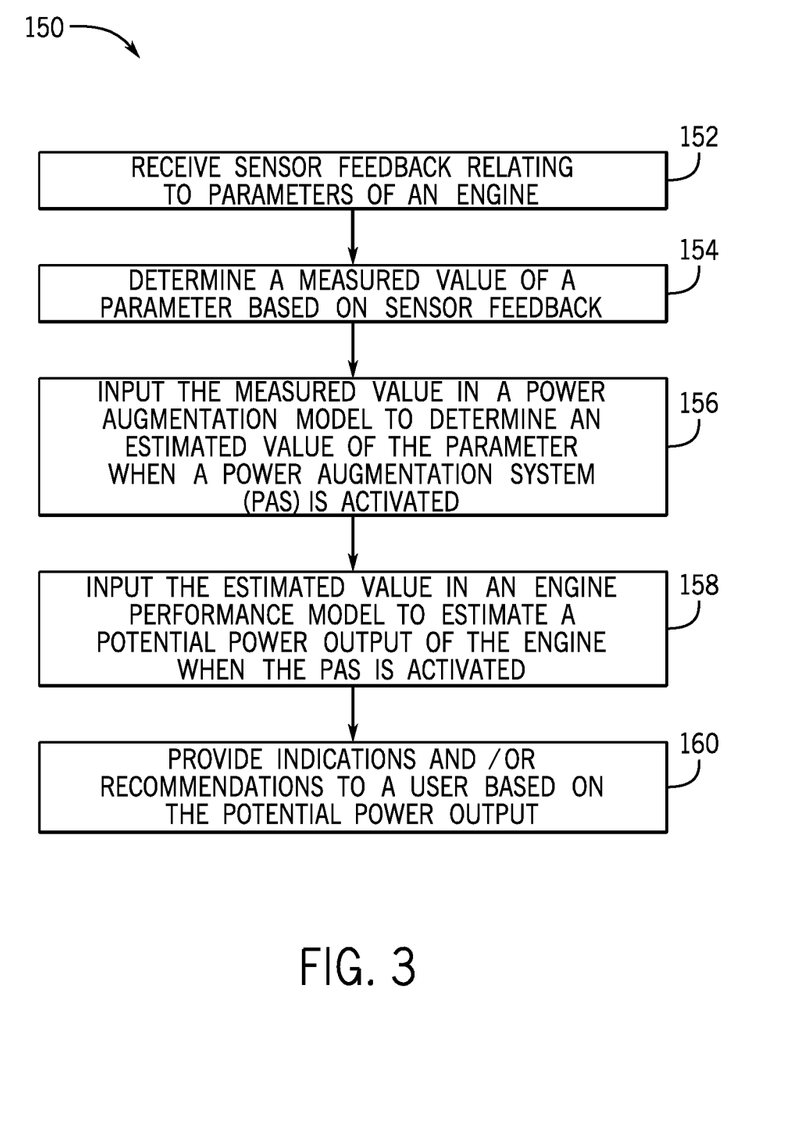
FIG. 3 is a flow diagram of a method for estimating a potential value of the power output of an engine caused by activation of a power augmentation system, in accordance with an embodiment of the present disclosure.

FIG. 3 is a flow chart of an embodiment of a computer-implemented method 150 for determining a potential value of the power output of an engine (e.g., the engine 14 or the gas turbine 82) if a power augmentation system 16 (e.g., a cooler, an oxidant cooler, the evaporative cooler 94, the chiller 96, the water supply 98, the compressor 100, the fuel supply 102, and/or the steam supply 104) is activated to augment the power output of the engine. One or more steps or all steps of the method 150 may be executed by the controller 12. The method 150 may include receiving (block 152) sensor feedback relating to one or more operating parameters (e.g., input and/or output operating parameters) of the engine. For example, the controller 12 may receive the engine sensor feedback 38, the ambient sensor feedback 40, and/or the power augmentation sensor feedback 42 from the sensors 110. Additionally, the method 150 may include determining (block 154) a measured value of at least one input operating parameter of the engine based on the sensor feedback. For example, in some embodiments, the controller 12 may determine the temperature, pressure, relative humidity, density, and/or composition of the oxidant 18 routed to the engine.

Further, the method 150 may include inputting (block 156) the measured value of the at least one input operating parameter in a power augmentation model 44 for the power augmentation system 16 to determine an estimated value of the at least one operating parameter caused by activation of the power augmentation system 16. Additionally, the method 150 may include inputting (block 158) the estimated value of the at least one input operating parameter in an engine performance model 48 to determine a potential value of the power output of the engine caused by activation of the power augmentation system 16. As discussed above, in some embodiments, the controller 12 may also input measured values of other input operating parameters and/or estimated values of other input operating parameters in the engine performance model 48 to the determine the potential value of the power output. Additionally, as discussed above, the controller 12 may input a performance metric for the engine in the engine performance model 48 to determine the potential value of the power output.

In some embodiments, the method 150 may include providing (block 160) one or more user-perceivable indications (e.g., visual indications) and/or recommendations based on the potential value of the power output of the engine. For example, the controller 12 may cause the input/output device 50 to display a numeric value and/or a graphical indication of the potential value of the power output. In certain embodiments, the controller 12 may cause the input/output device 50 to display recommendations based on a comparison of the potential value of the power output to a threshold. For example, the controller 12 may cause the input/output device 50 to display a recommendation to activate the power augmentation system 16 if the potential value is above a predetermined threshold and/or a recommendation to keep the power augmentation system 16 deactivated if the potential value is below the predetermined threshold.

Figure 4:
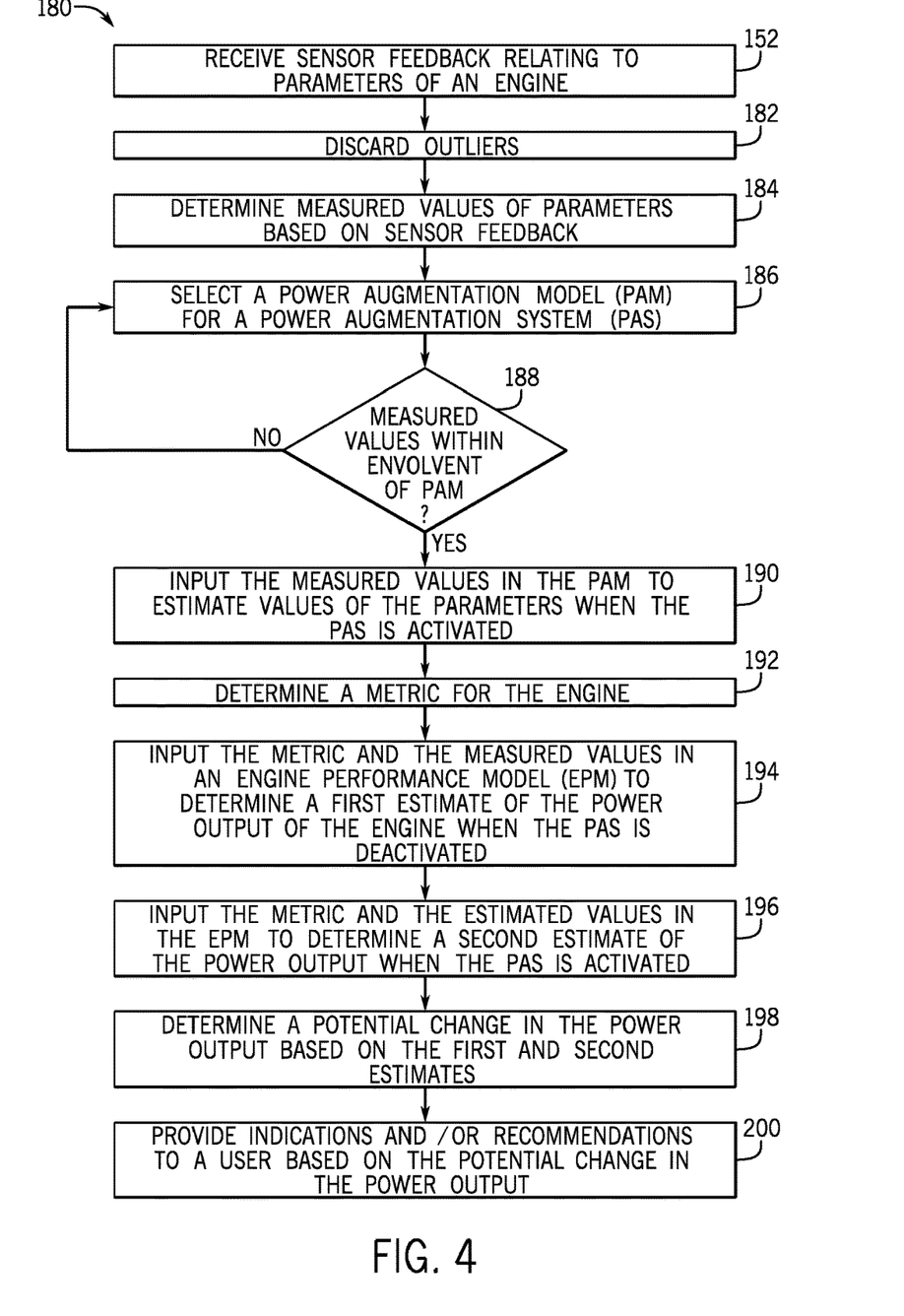
FIG. 4 is a is a flow diagram of a method for estimating a potential change in the power output of an engine caused by activation of a power augmentation system, in accordance with an embodiment of the present disclosure.

FIG. 4 is a flow chart of an embodiment of a computer-implemented method 180 for determining a potential change in the power output of an engine (e.g., the engine 14 or the gas turbine 82) caused by activation of a power augmentation system 16 (e.g., the evaporative cooler 94, the chiller 96, the water supply 98, the compressor 100, the fuel supply 102, and/or the steam supply 104) used to augment the power output of the engine. One or more steps or all steps of the method 180 may be executed by the controller 12. The method 180 may include receiving (block 152) sensor feedback relating to one or more operating parameters (e.g., input and/or output operating parameters) of the engine. In some embodiments, the method 180 may include discarding (block 182) outliers in the sensor feedback and/or data in the sensor feedback that is determined to be incomplete or erroneous. Further, the method 180 may include determining (block 184) measured values of one or more input operating parameters of the engine based on the sensor feedback.

Additionally, the method 180 may include selecting (block 186) a power augmentation model 44 for the power augmentation system 16. In some embodiments, the memory 34 and/or the database 46 may store different power augmentation models 44 for the same component of the power augmentation system 16 (e.g., the evaporative cooler 94, the chiller 96, the water supply 98, etc.) that use different input operating parameters and/or that output different input operating parameters. For example, in some embodiments, the memory 34 and/or the database 46 may store a temperature drop model (e.g., temperature reduction model) for the evaporative cooler 94 that is configured to estimate a potential value of the temperature of the oxidant 18 (e.g., ambient air) based on a measured value of the temperature of the oxidant 18, and the memory 34 and/or the database 46 may store a saturation efficiency model for the evaporative cooler 94 that is configured to estimate a potential value of the temperature of the oxidant 18 based on measured values of the temperature and relative humidity of the oxidant 18.

In some embodiments, the controller 12 may select a power augmentation model 44 from a plurality of power augmentation models 44 based on the available measured input operating parameters and the input operating parameters used by the power augmentation models 44. For example, a power augmentation model 44 may not be suitable for use if the measured value of an input operating parameter used in the power augmentation model 44 is unknown. In certain embodiments, each power augmentation model 44 may be associated with a performance metric indicative of the accuracy of the power augmentation model 44, and the controller 12 may select a power augmentation model 44 based on the performance metrics for the performance augmentation models 44. For example, the controller 12 may select the power augmentation model 44 with the highest performance metric provided that the power augmentation model 44 is appropriate based on the available measured input operating parameters. In some embodiments, the controller 12 may select a power augmentation model 44 based on user input via the input/output device 50.

In some embodiments, the method 180 may include determining (query 188) whether the measured values of the one or more input operating parameters are inside the envolvent of the power augmentation model 44. As discussed below with respect to FIG. 6, the power augmentation model 44 may be trained using a plurality of measured values of the one or more input operating parameters. The envolvent of the power augmentation model 44 includes a range of measured values of the one or more input operating parameters that are appropriate for use with the power augmentation model 44 based on the training of the power augmentation model 44. That is, if the power augmentation model 44 has been proven to work (e.g., provide an accurate estimated value) with the measured value based on the training of the power augmentation model 44, then the measured value falls inside of the envolvent of the power augmentation model 44. Conversely, if the power augmentation model 44 has not been proven to work with the measured value based on the training, then the measured value falls outside of the envolvent of the power augmentation model 44.

If the measured values do not fall inside the envolvent of the power augmentation model 44, the method 180 may include selecting (block 186) a different power augmentation model 44. Additionally or alternatively, the controller 12 may continue to receive (block 182) sensor feedback and determine (block 184) measured values of the input operating parameters until the measured values are determined to fall inside of the envolvent of a selected power augmentation model 44. If the measured values fall inside of the envolvent, the method 180 may include inputting (block 190) the measured values of the one or more input operating parameters in the power augmentation model 44 to determine estimated values of the one or more input operating parameters that may occur if the power augmentation system 16 is activated. For example, the power augmentation model 44 may estimate the potential value of the temperature of the oxidant 18 if the power augmentation system 16 is activated based on the measured value (e.g., a real-time or substantially real time value) of the temperature of the oxidant 18.

Additionally, in some embodiments, the method 180 may include determining (block 192) a performance metric for the engine. In some embodiments, the performance metric may be stored in the memory 34 of the controller 12, downloaded from the database 46, and/or inputted by a user using the input/output device 50. In certain embodiments, the controller 12 may determine the performance metric based on the sensor feedback, as discussed below in FIG. 5. Further, the method 180 may include inputting (block 194) the performance metric and the measured values of the input operating parameters in an engine performance model 48 to determine a first estimate of the power output of the engine when the power augmentation system 16 is deactivated. Additionally, the method 180 may include inputting (block 196) the performance metric and the estimated values of the input operating parameters in the engine performance model 48 to determine a second estimate of the power output of the engine when the power augmentation system 16 is activated. Further, the method 180 may include determining (block 198) a potential change in the power output of the engine caused by activation of the power augmentation system 16 based on the difference between the first estimate and the second estimate.

Additionally, in some embodiments, the method 180 may include providing (block 200) one or more user-perceivable indications (e.g., visual indications) and/or recommendations based on the potential change in the power output of the engine caused by activation of the power augmentation system 16. For example, the controller 12 may cause the input/output device 50 to display a numeric value and/or a graphical indication of the potential change in the power output. In certain embodiments, the controller 12 may cause the input/output device 50 to display recommendations based on a comparison of the potential change in the power output to a threshold. For example, the controller 12 may cause the input/output device 50 to display a recommendation to activate the power augmentation system 16 if the potential change is above a predetermined threshold and/or a recommendation to keep the power augmentation system 16 deactivated if the potential change is below the predetermined threshold.

Figure 5:
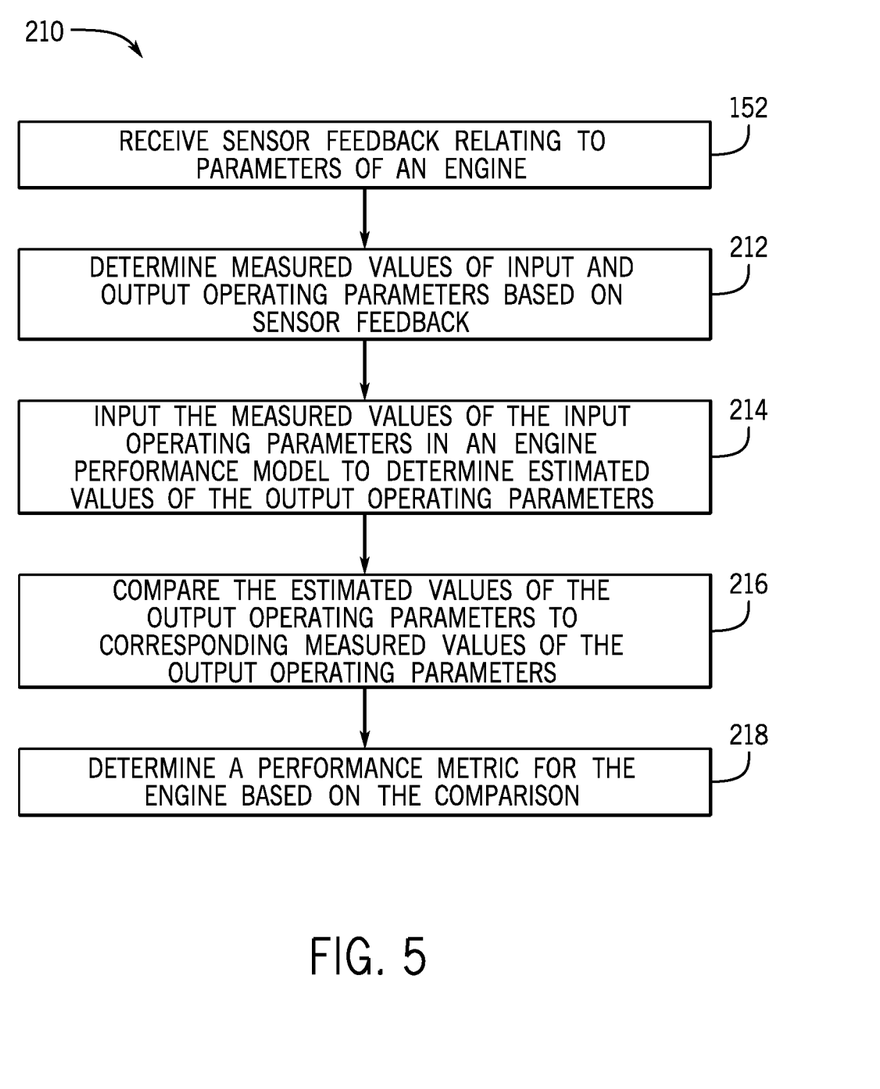
FIG. 5 is flow diagram of a method for determining a performance metric of an engine using an engine performance model, in accordance with an embodiment of the present disclosure.

FIG. 5 is a flow chart of an embodiment of a computer-implemented method 210 for determining a performance metric of an engine (e.g., the engine 14 or the gas turbine 82). One or more steps or all steps of the method 210 may be executed by the controller 12. The method 210 may include receiving (block 152) sensor feedback relating to one or more operating parameters (e.g., input and/or output operating parameters) of the engine. Additionally, the method 210 includes determining (block 212) measured values of one or more input operating parameters and one or more output operating parameters of the engine based on the sensor feedback. Further, the method 210 includes inputting (block 214) the measured values of the one or more input operating parameters in an engine performance model 48 to determine one or more estimated values of one or more output operating parameters of the engine. Additionally, the method 210 includes comparing (block 216) the estimated values of the one or more output operating parameters to corresponding measured values of the one or more output operating parameters and determining (block 218) a performance metric of the engine based on the comparison.

As noted above, in some embodiments, the controller 12 may determine a performance metric for each estimated output operating parameter. In certain embodiments, the controller 12 may determine an overall performance metric for the engine based on the differences between the estimated values and the measured values. The one or more performance metrics may be indicative of degradation of the engine, inefficiencies of the engine, and/or an amount of deviation from ideal behavior. Accordingly, the performance metrics may be based on the difference between the estimated value and the measured value (e.g., the extent or magnitude of the deviation from expected or ideal behavior). For example, the controller 12 may determine a first performance metric based on a first difference between an estimated value of an output operating parameter and a measured value of the output operating parameter, and the controller 12 may determine a second performance metric based on a second difference between an estimated value of the output operating parameter and a measured value of the output operating parameter. The second performance metric may be indicative of a greater amount of degradation of the engine as compared to the first performance metric if the second difference is greater than the first difference.

Figure 6:
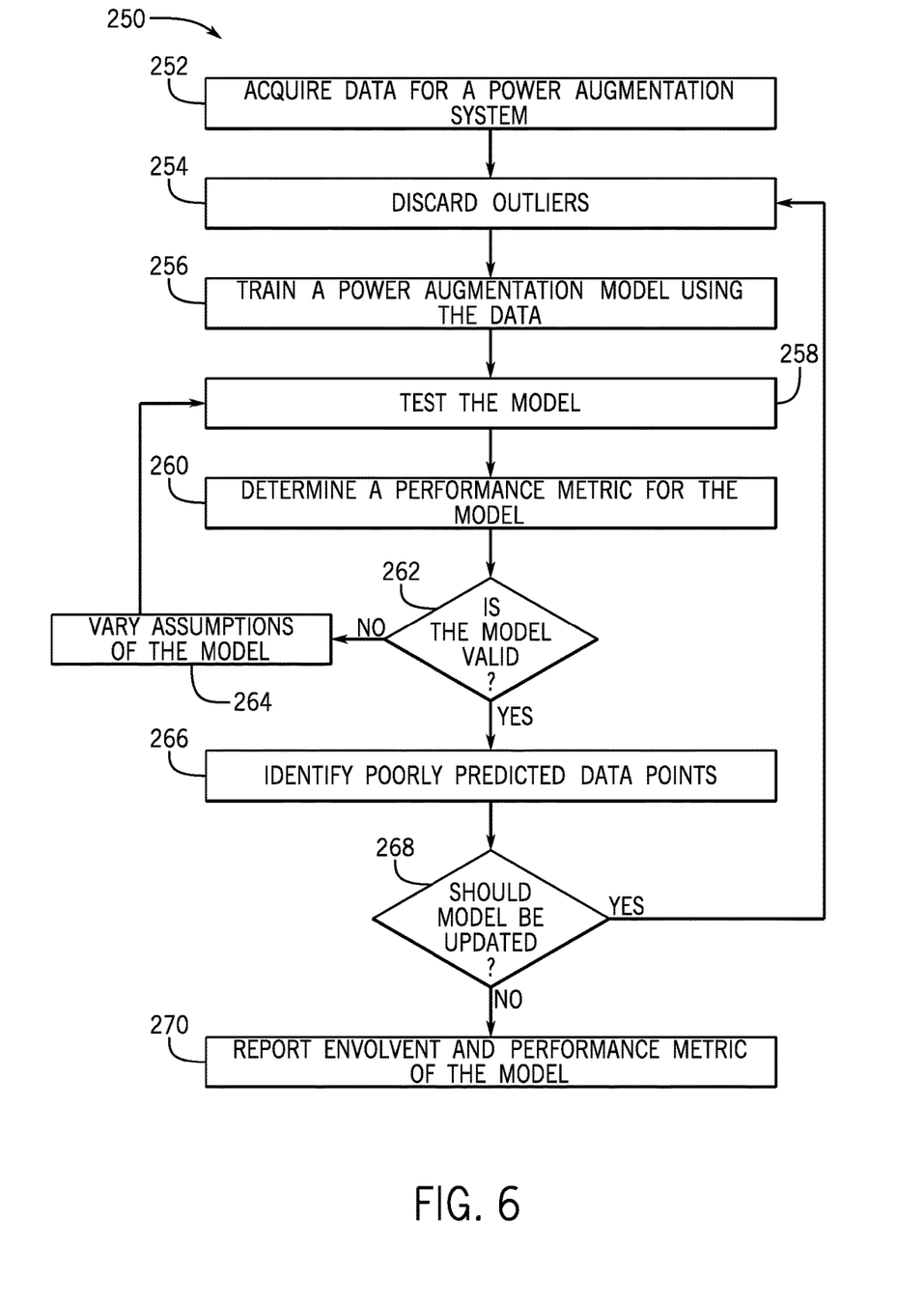
FIG. 6 is a flow diagram of a method for generating a power augmentation model, in accordance with an embodiment of the present disclosure.

FIG. 6 is a flow chart of an embodiment of a computer-implemented method 250 for generating a power augmentation model 44 for a component of a power augmentation system 16 (e.g., the evaporative cooler 94, the chiller 96, the water supply 98, the compressor 100, the fuel supply 102, or the steam supply 104). One or more steps or all steps of the method 250 may be executed by the controller 12. The method 250 may include acquiring (block 252) data (e.g., historical data) for the component of the power augmentation system 16. The data may include measured input values (e.g., historical values) of parameters of the component and corresponding measured output values (e.g., historical values) of parameters of the component that resulted from the measured input values. For example, if the component is the evaporative cooler 94, the measured input values may include measured values of the temperature, relative humidity, pressure, density, and/or composition of the oxidant 18 entering the evaporative cooler 94, and the measured output values may include measured values of the temperature, relative humidity, pressure, density, and/or composition of the oxidant 18 exiting the evaporative cooler 94. In some embodiments, the method 250 may include discarding (block 254) outliers and/or incomplete data.

Additionally, the method 250 may include training (block 256) the power augmentation model 44 using the data. In particular, training (block 256) the power augmentation model 44 may include identifying predictive patterns and/or relationships between the input values and the output values. For example, the training may identify a predictive relationship between particular input values of ambient temperature and ambient humidity and particular output values of the oxidant 18 temperature, which may be used to predict the temperature of the oxidant 18 exiting the evaporative cooler 94 for particular values of the ambient temperature and humidity. Further, the method 250 may include testing (block 258) the power augmentation model 44 and determining (block 260) a performance metric for the power augmentation model 44 based on the testing. The performance metric may be indicative of the accuracy of the power augmentation model 44. In some embodiments, the method 250 may include determining (query 262) whether the power augmentation model 44 is valid based on the performance metric, the number of testing iterations, and/or the variation of assumptions of the power augmentation model 44. If the power augmentation model 44 is determined to be invalid, the method 250 may include varying (block 264) assumptions of the power augmentation model 44 and testing (block 258) the power augmentation model 44 using the varied assumptions. If the power augmentation model 44 is determined to be valid, the method 250 may include identifying (block 266) data points (e.g., measured values) that are poorly predicted by the power augmentation model 44 and determining (query 268) whether the power augmentation model 44 should be updated based on the percentage of poorly predicted data points. If the power augmentation model 44 should be updated, the method 250 may include discarding (block 254) the poorly predicted data points and training (block 256) the power augmentation model 44 using the updated data set. If the power augmentation model 44 does not need to be upgraded, the method 250 may include reporting (block 270) the envolvent and the performance metric of the power augmentation model 44.

Technical effects of the invention may include estimating (e.g., via a processor-based controller) a potential change in the power output of an engine caused by activation of a power augmentation system. Specifically, the disclosed embodiments illustrate the controller 12 that may use a power augmentation model 44 with a measured value of at least one input operating parameter of an engine (e.g., the engine 14, the gas turbine 82, etc.) to estimate a potential value of the at least one input operating parameter caused by activation of the power augmentation system 16. The power augmentation model 44 may be generated and trained using historical data from the specific power augmentation system 16 that is used with the engine. In this manner, the power augmentation model 44 may account for performance characteristics and efficiencies that are specific to the power augmentation system 16, which may increase the accuracy of potential values of operating parameters estimated by the power augmentation model 44. Additionally, the controller 12 may use the estimated values of the input operating parameters in an engine performance model 48 to estimate a potential value of the power output of the engine when the power augmentation system 16 is activated. In some embodiments, the controller 12 may use the potential value of the power output to determine a potential change in the power output caused by activation of the power augmentation system 16. For example, the controller 12 may compare the potential value of the power output to a determined or measured value of the power output (e.g., a real-time or substantially real-time value) when the power augmentation system 16 is deactivated and/or may estimate a potential value of the power output when the power augmentation system 16 is deactivated using the engine performance model 48 with measured values of the input operating parameters. Additionally, in some embodiments, the controller 12 may use a performance metric for the engine in the engine performance model 48 to increase the accuracy of parameters estimated using the engine performance model 48, such as the power output. Further, the controller 12 may provide the potential change in the power output and/or recommendations based on the potential change in the power output to a user, which may facilitate the user in determining whether to activate the power augmentation system 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
an engine configured to generate power to drive a load;
a power augmentation system configured to augment a power output of the engine when the power augmentation system is activated; and
a controller operatively coupled to the power augmentation system, wherein the controller is configured to:

estimate a potential value of a first operating parameter of the engine caused by activation of the power augmentation system by inputting a measured value of the first operating parameter of the engine in a power augmentation model for the power augmentation system;

estimate a potential change in the power output of the engine caused by activation of the power augmentation system by inputting the measured value and the potential value of the first operating parameter in an engine performance model for the engine that predicts power output of the engine; and activate the power augmentation system if estimated power output is greater than a desired power output or increase in the power output, wherein the engine is configured to receive an oxidant and to combust a mixture of fuel and the oxidant to generate power to drive the load, the first operating parameter comprises a temperature of the oxidant, and the power augmentation system is configured to increase the power output of the engine by reducing the temperature of the oxidant, and wherein the power augmentation system comprises an evaporative cooler, and the controller is configured to input the measured value of the temperature of the oxidant and a measured value of a relative humidity of the oxidant in the power augmentation model to estimate the potential value of the temperature of the oxidant caused by activation of the evaporative cooler.

2. The system of claim 1, wherein the controller is configured to input a performance metric for the engine in the engine performance model to estimate the potential change in the power output, wherein the performance metric is indicative of degradation of the engine.

3. The system of claim 2, wherein the controller is configured to:

input the measured value of the first operating parameter in the engine performance model to generate an estimated value of a second operating parameter of the engine; and determine the performance metric based on a difference between the estimated value of the second operating parameter of the engine and a measured value of the second operating parameter of the engine.

4. The system of claim 3, wherein the second operating parameter comprises the power output of the engine.

5. The system of claim 1, wherein the controller is configured to:

input the measured value of the first operating parameter in the engine performance model to generate a first estimate of the power output of the engine when the power augmentation system is deactivated;

input the potential value of the first operating parameter in the engine performance model to generate a second estimate of the power output of the engine when the power augmentation system is activated; and estimate the potential change in the power output of the engine based on a difference between the first estimate and the second estimate.

6. The system of claim 1, wherein the first operating parameter comprises ambient temperature, ambient pressure, ambient relative humidity, or a combination thereof.

7. The system of claim 1, wherein the power augmentation system comprises an evaporative cooler, a chiller, a water injection system, or a combination thereof.

8. The system of claim 1, wherein the power augmentation model comprises a saturation efficiency model.

9. The system of claim 1, wherein the engine is configured to receive an oxidant and to combust a mixture of fuel and the oxidant to generate power to drive the load, the first operating parameter comprises a pressure of the oxidant, and the power augmentation system is configured to increase the power output of the engine by increasing the pressure of the oxidant.

10. The system of claim 9, wherein the power augmentation system comprises a compressor.

11. The system of claim 1, wherein the controller is configured to select the power augmentation model from a plurality of power augmentation models.

12. A system, comprising:

a controller operatively coupled to a power augmentation system configured to increase a power output of an engine, wherein the controller is configured to:

measure a plurality of operating parameters of the engine using a plurality of sensors;

estimate a potential value of a first operating parameter of the plurality of operating parameters caused by activation of the power augmentation system by inputting a measured value of the first operating parameter of the plurality of operating parameters in a power augmentation model for the power augmentation system;

estimate a potential increase in the power output of the engine caused by activation of the power augmentation system by inputting the measured value and the potential value of the first operating parameter of the plurality of operating parameters in an engine performance model for the engine that predicts power output of the engine; and activate the power augmentation system if the potential increase in the power output is greater than a desired power output or increase in the power output, wherein the first operating parameter comprises a temperature of an oxidant routed to the engine, the power augmentation system comprises an evaporative cooler configured to reduce the temperature of the oxidant, the controller is configured to select the power augmentation model from at least two power augmentation models, the at least two power augmentation models comprises a temperature reduction model configured to estimate a potential value of the temperature of the oxidant after passing through the evaporative cooler based on a measured initial value of the temperature of the oxidant, and the at least two power augmentation models comprises a saturation efficiency model configured to estimate the potential value of the temperature of the oxidant after passing through the evaporative cooler based on the measured initial value of the temperature of the oxidant and a measured initial value of a relative humidity of the oxidant.

13. The system of claim 12, wherein plurality of operating parameters of the engine comprises a plurality of input operating parameters and a plurality of output operating parameters, and the controller is configured to:

input the measured value of the first operating parameter and measured values of the plurality of input operating parameters in the engine performance model to generate a first estimate of the power output of the engine when the power augmentation system is deactivated;

input the potential value of the first operating parameter and the measured values of the plurality of input operating parameters in the engine performance model to generate a second estimate of the power output of the engine when the power augmentation system is activated; and estimate the potential change in the power output of the engine based on a difference between the first estimate and the second estimate.

14. The system of claim 13, wherein the controller is configured to:
input the measured values of the plurality of input operating parameters in the engine performance model to generate estimated values of the plurality of output parameters;
determine at least one performance metric based on differences between the measured values of the plurality of input operating parameters and corresponding estimated values of the plurality of output operating parameters;
input the at least one performance metric in the engine performance model to generate the first estimate and the second estimate of the power output of the engine.

15. The system of claim 14, wherein the plurality of input operating parameters comprises ambient temperature, ambient pressure, ambient relative humidity, an amount of fuel flowing to a combustor of the engine, a rotational speed of a turbine of the engine, or a combination thereof, and the plurality of output operating parameters comprises the power output, an exhaust gas temperature, a compressor discharge pressure, a compressor discharge pressure, or a combination thereof.

16. A method, comprising:
measuring, via a controller, a plurality of operating parameters of an engine;
selecting, via the controller, a power augmentation model from two or more power augmentation models for a power augmentation system configured to increase a power output of the engine;
estimating, via the controller, a potential value of a first operating parameter of the plurality of operating parameters caused by activation of the power augmentation system by inputting a measured value of the first operating parameter of the plurality of operating parameters in the power augmentation model;
estimating, via the controller, a potential increase in the power output of the engine caused by activation of the power augmentation system by inputting the measured value and the potential value of the first operating parameter of the plurality of operating parameters in an engine performance model for the engine that predicts power output of the engine; and activate the power augmentation system if the potential increase in the power output is greater than a desired power output or increase in the power output, wherein the engine is configured to receive an oxidant and to combust a mixture of fuel and the oxidant to generate the power to drive a load, the first operating parameter comprises a temperature of the oxidant, and the power augmentation system is configured to increase the power output of the engine by reducing a temperature of the oxidant, and wherein the power augmentation system comprises an evaporative cooler, and the controller is configured to input the measured value of the temperature of the oxidant and a measured value of a relative humidity of the oxidant in the power augmentation model to estimate the potential value of the temperature of the oxidant caused by activation of the evaporative cooler.

17. The method of claim 16, wherein the plurality of operating parameters comprises a plurality of input parameters and a plurality of output parameters, and the method comprises:
inputting, via the controller, measured values of the plurality of input operating parameters in the engine performance model to generate estimated values of the plurality of output parameters;
determining, via the controller, at least one performance metric based on differences between the measured values of the plurality of input operating parameters and corresponding estimated values of the plurality of output operating parameters;
inputting, via the controller, the measured value of the first operating parameter, the measured values of the plurality of input operating parameters, and the at least one performance metric in the engine performance model to generate a first estimate of the power output of the engine when the power augmentation system is deactivated;
inputting, via the controller, the potential value of the first operating parameter, the measured values of the plurality of input operating parameters, and the at least one performance metric in the engine performance model to generate a second estimate of the power output of the engine when the power augmentation system is activated; and
estimating, via the controller, the potential change in the power output of the engine based on a difference between the first estimate and the second estimate.

* * * * *